United States Patent
Chan

(10) Patent No.: US 9,630,038 B2
(45) Date of Patent: Apr. 25, 2017

(54) HOLE-DRILLING AND WALL-PENETRATING FIRE EXTINGUISHING DEVICE

(71) Applicant: So Chan, Tsuen Wan (HK)

(72) Inventor: So Chan, Tsuen Wan (HK)

( * ) Notice: Subject to any disclaimer, the term of this patent is extended or adjusted under 35 U.S.C. 154(b) by 0 days.

(21) Appl. No.: 14/908,693

(22) PCT Filed: Sep. 23, 2013

(86) PCT No.: PCT/CN2013/083991
§ 371 (c)(1),
(2) Date: Jan. 29, 2016

(87) PCT Pub. No.: WO2015/014009
PCT Pub. Date: Feb. 5, 2015

(65) Prior Publication Data
US 2016/0166865 A1    Jun. 16, 2016

(30) Foreign Application Priority Data
Jul. 30, 2013    (CN) .......................... 2013 1 0325818

(51) Int. Cl.
*A62C 31/22* (2006.01)
*A62C 31/02* (2006.01)
(Continued)

(52) U.S. Cl.
CPC ................. *A62C 31/22* (2013.01); *A62C 3/00* (2013.01); *A62C 27/00* (2013.01); *A62C 31/02* (2013.01);
(Continued)

(58) Field of Classification Search
CPC ......... A62C 31/22; A62C 31/05; A62C 31/02; A62C 27/00; A62C 3/00; B23B 51/06;
(Continued)

(56) References Cited

U.S. PATENT DOCUMENTS 4,147,216 A * 4/1979 Schnepfe, Jr. ......... A62C 31/22
169/70
4,676,319 A 6/1987 Cuthbertson
(Continued)

FOREIGN PATENT DOCUMENTS

CN           2659489      12/2004
CN          201342202     11/2009
(Continued)

*Primary Examiner* — Steven J Ganey
(74) *Attorney, Agent, or Firm* — Bay State IP, LLC

(57) ABSTRACT

A drilling and through-wall fire extinguishing device comprises a main water turbine, a forward and reverse commutator, a reducing sleeve, a hollow drill bit, a handwheel booster, a guide rail, a water separator, a vice water turbine and a high pressure water pump. The handwheel booster is connected with the main water turbine, the main water turbine is drivingly connected with the hollow drill bit through the forward and reverse commutator, the reducing sleeve is arranged between the hollow drill bit and the forward and reverse commutator, and the main water turbine and the forward and reverse commutator are fixed on the guide rail; and fire-fighting pressure water is fed by the water separator, a first water outlet of the water separator is communicated with the main water turbine, a second water outlet is communicated with the vice water turbine, and the vice water turbine is drivingly connected with the high pressure water pump.

10 Claims, 1 Drawing Sheet

(51) Int. Cl.
*A62C 3/00* (2006.01)
*A62C 27/00* (2006.01)
*F03B 13/00* (2006.01)
*A62C 31/05* (2006.01)
*B23B 51/06* (2006.01)
*F03B 13/02* (2006.01)

(52) U.S. Cl.
CPC .............. *A62C 31/05* (2013.01); *B23B 51/06* (2013.01); *F03B 13/00* (2013.01); *F03B 13/02* (2013.01); *B23B 2222/84* (2013.01); *B23B 2226/31* (2013.01); *B23B 2226/75* (2013.01); *F05B 2220/602* (2013.01); *Y02B 10/50* (2013.01)

(58) Field of Classification Search
CPC ............ B23B 2222/84; B23B 2226/31; B23B 2226/75; F03B 13/00; F03B 13/02; F05B 2220/602; Y02B 10/50
USPC ................................ 169/24, 54, 70; 239/271
See application file for complete search history.

(56) References Cited

U.S. PATENT DOCUMENTS

| | | | | |
|---|---|---|---|---|
| 5,351,891 A * | 10/1994 | Hansen | ................. | B05B 3/001 169/70 |
| 6,340,060 B1 * | 1/2002 | Larsson | ................. | A62C 31/22 169/24 |
| 6,755,259 B2 * | 6/2004 | Peltola | ................. | A62C 31/22 239/271 |
| 7,806,195 B2 * | 10/2010 | Popp | ................. | A62C 3/08 169/70 |
| 2008/0053668 A1 * | 3/2008 | Al-Osaimi | ............. | A62C 31/28 169/70 |

FOREIGN PATENT DOCUMENTS

| | | |
|---|---|---|
| CN | 202412061 | 9/2012 |
| CN | 103212178 | 7/2013 |
| CN | 203389264 | 1/2014 |

\* cited by examiner

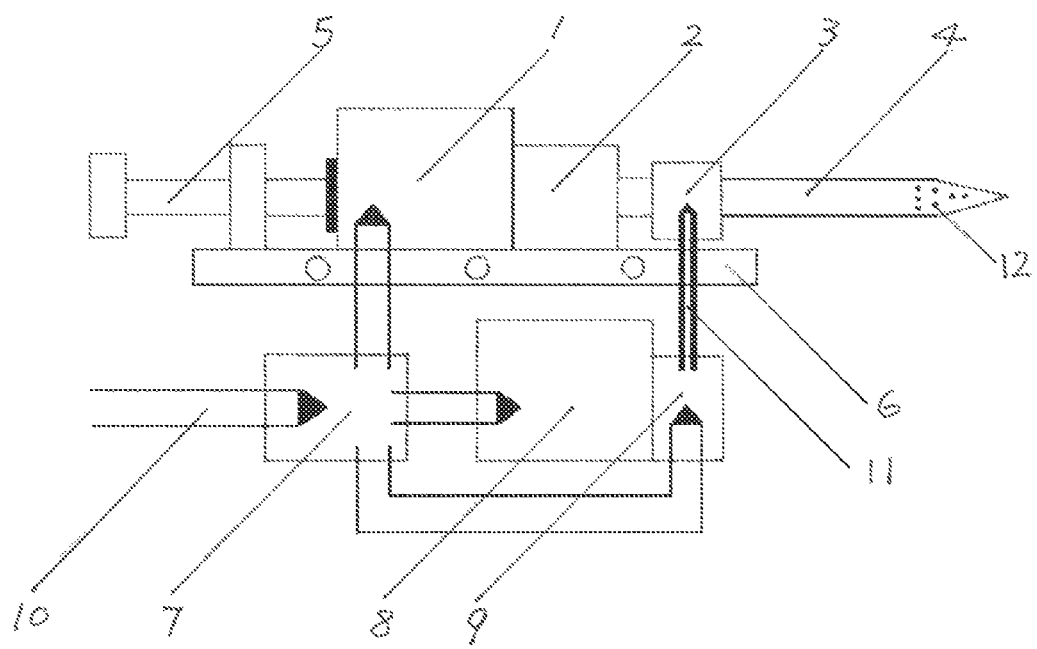

HOLE-DRILLING AND WALL-PENETRATING FIRE EXTINGUISHING DEVICE

CROSS REFERENCE TO RELATED APPLICATION

This application is for entry into the U.S. National Phase under §371 for International Application No. PCT/CN2013/083991 having an international filing date of Sep. 23, 2013, and from which priority is claimed under all applicable sections of Title 35 of the United States Code including, but not limited to, Sections 120, 363, and 365(c), and which in turn claims priority under 35 USC 119 to Chinese Patent Application No. 201310325818.6 filed on Jul. 30, 2013.

TECHNICAL FIELD

This invention relates to fire protection technical field, in particular a hole-drilling and wall-penetrating fire extinguishing device.

BACKGROUND ART

In case of fire occurring in any unit in an urban high-rise or super high-rise building, if no fire engine can reach the height of the unit on fire, the high temperature and flame in the unit on fire are sufficient to burn most of the articles in its upper, lower, left and right neighboring units if the fire in the said unit is not put out in time, which may cause more and bigger fire disasters.

Firefighting of urban high-rise and super high-rise buildings is still a worldwide firefighting challenge till today. As high-rise building firefighting needs grow, the firefighting height of fire engines has developed and reached 100 m level. However, their fabrication cost, road assistance and weather condition among other requirements cannot always be affordable by all medium and small cities having high-rise buildings. Meanwhile, restrained by the technological and safety level of the present stage, firefighting height of fire engines cannot be increased without limit to accommodate for the height increase of urban high-rise buildings. Even with the currently available fire engines with a 100 m firefighting height, it is also difficult to cope with a fire occurring in high-rise or super high-rise buildings measured more than 100 m in height. No to mention the firefighting height of the fire engines in most cities is below 50 m, which can only be used to effectively putting out a fire occurring on the 20$^{th}$ floor and lower.

Besides the elevated fire engine which can be used for fire extinguishing in high-rise buildings, presently there are two technologies that can largely be employed for putting out fires in high-rise buildings: missile type fire extinguishing device and abrasive hole-drilling fire extinguishing device.

According to a news report dated Jul. 10, 2013, missile fire extinguishing has undergone a live missile fire extinguishing test with success achieved, which will add another means of fire extinguishing for high-rise and super high-rise buildings. However, since the tail end of its ballistic trajectory appears in a parabolic shape, a certain distance and space is needed to launch the missile when it is applied in densely distributed building groups in cities, especially when it is used for putting out a fire in high-rise and super high-rise buildings. During fire extinguishing on an urban street where the space is limited, its use may be restrained if the object is too close to the launching point. And the use and maintenance of dangerous ammunitions and precision control devices by the fire brigades will also be somewhat difficult.

Abrasive hole-drilling fire extinguishing device (water jet technology) is a fire extinguishing device named COBRA which was invented by a foreign company. There are also some manufacturers in China producing similar fire extinguishing device. This kind of device needs a power machine with scores of horsepower to produce more than 300 kilograms high-pressure water, which is mixed with iron sand abrasive compound to jet impact the wall or iron plate to form small pores, through which high-pressure water mist is produced and used for fire extinguishing. However, both the power and the volume of it are fairly big, and the equipment is fairly complicated. Most of such devices need to be mounted on various kinds of large or small vehicles in order to have them transported to the fire extinguishing site.

Abrasive hole-drilling fire extinguishing device partially belongs to high-pressure vessel, and its application, repair and maintenance are quite restricted. The mixture of high-pressure water produced by abrasive hole-drilling fire extinguishing device and abrasive sand may penetrate 1 cm thick iron plate or ordinary construction materials with a thickness of appr. 20 cm. However, it cannot penetrate high-rise building walls such as thick hollow brick walls, partition walls and load-bearing walls with a thickness of more than 40 cm, as well as compound walls built by using multiple types of materials and double-layer biparting household burglarproof doors. Since it is based on abrasive jet technology, holes can be effectively drilled only when a certain range is kept for the jet flow produced. Away from the core section of the range, hole-drilling is impossible in the rupture section. Therefore, the penetration depth of an abrasive hole-drilling fire extinguishing device is limited.

Of course, there are many other fire extinguishing devices which can penetrate an object. However, these cannot be directly used for firefighting of high-rise and super high-rise buildings. For example, there is kind of fire engine abroad, whose telescopic arm has percussion bit on it, which can be used to drill through the shell of an aircraft for the purpose of fire extinguishing. However, due to its huge size, it cannot enter a high-rise building for fire extinguishing. Other methods include the use of pneumatic, hydraulic or electric percussion drill, which can be employed to penetrate cars or shells made of thin materials. However, percussion strikes are not applicable for penetration of hard and thick materials. Furthermore, in case of big fires in oil depots caused by lightning strikes, the oil level cannot be reached often because the fire engine is not high enough or the foam is too light and the range is too short. Long-time combustion may cause an explosion, spreading to neighboring oil tanks.

A kind of fire extinguishing equipment that can quickly penetrate the building walls underthe dual effect of rotating bit and high-pressure water jet was disclosed in the Chinese patent with a utility model Patent No. ZL201220077916 and entitled "A kind of high-pressure water wall penetrating fire extinguishing device", which can be used for high-efficiency wall penetrating and fire extinguishing. However, the said fire extinguishing equipment has the following shortcomings: Firstly, building walls cannot be penetrated by using high-pressure water alone. There must be a blend of abrasive sand as well as super high-pressure water in order to penetrate a building wall within a certain range. Secondly, limited range for high-pressure water jet wall penetration. Thickness of wall to be penetrated will not exceed 20 cm. Thirdly, the jet gun used for high-pressure water jet is special with a high reaction force, which can be held against only by shoulder. This structure can be pushed away by the high-pressure water and cannot be used properly (See COBRA abrasive hole-drilling fire extinguishing device). Fourthly, its long drill bit can easily shake when drilled into a wall body, for which supporting frame or guide rail must be provided. Otherwise, the drill bit can be easily broken or can easily drift. Fifthly, since electric motor is used as its power unit, it can be difficult to access electric power in case of fire.

DESCRIPTION OF THE PRESENT INVENTION

In lieu of the shortcomings existing with the aforementioned technologies, the present invention provides a hole-drilling and wall-penetrating fire extinguishing device to deal with fire accidents occurring in urban high-rise or super high-rise buildings, which can be used for safe, quick, easy and effective extinguishing of any fire occurring on any floor of high-rise or super high-rise buildings.

To fulfill the aforementioned objectives, the present invention provides a hole-drilling and wall-penetrating fire extinguishing device, comprising main hydroturbine, forward/backward diverter, adapting sleeve, hollow drill bit, hand-wheel booster, guide rail, water distributor, auxiliary hydroturbine, high-pressure water pump, adapting sleeve, hollow drill bit, hand-wheel booster, guide rail, water distributor, auxiliary hydroturbine and high-pressure water pump;

The said hand-wheel booster is connected with the main hydroturbine, the main hydroturbine is connected with the drive of hollow drill bit via the forward/backward diverter, adaptive sleeve is provided between the said hollow drill bit and the forward/backward diverter, and the said main hydroturbine and the forward/backward diverter are fixed on the guide rail;

The high-pressure water hose used for connecting the pressure fire water pipe is connected with the inlet of the water distributor, the first outlet of the said water distributor is connected with the main hydroturbine, the second outlet of the said water distributor is connected with the auxiliary hydroturbine, the said auxiliary hydroturbine is connected with the drive of the high-pressure water pump, the third outlet of the said water distributor is connected with the inlet of the high-pressure water pump, and the outlet of the said high-pressure water pump is connected with the hollow drill bit via the adaptive sleeve; and a number of small pores used for direct jetting and diffusing are provided near the tip of the said hollow drill bit.

Wherein the said main hydroturbine is a singular hydroturbine or a hydroturbine bank composed of at least two hydroturbines.

Wherein the said forward/backward diverter is a reversing gearbox composed of one gear set which turns the singular rotating direction inputted by the main hydroturbine into two rotating directions, namely, forward and backward directions.

Wherein, the said hollow drill bit is a carbon steel drill bit used for cutting iron and steel, a diamond drill bit used for cutting glass or an artificial hollow thin-walled diamond drill bit used for cutting concrete.

Wherein the said adapting sleeve is installed at the rear-end neck of the hollow drill bit, on which more than one quick couplings are provided and used for connecting with the external fire extinguishing agent.

Wherein the said hand-wheel booster is composed of rotating hand-wheel and thick screw, and the said hand-wheel and thick screw are horizontally connected one after another, or are connected at 90° with each other through a right-angle bevel gear.

Wherein the said high-pressure water pump is a plunger type or centrifugal light-duty high-pressure water pump.

Wherein the said fire extinguishing device also includes a multi-angle support used for fixing the guide rail and changing the operating angle of the components on the guide rail, and the said multi-angle support is fixedly coupled with the guide rail.

Wherein the said fire extinguishing device also includes chuck used for fixing the multi-angle support, and the said support fixing chuck is manual vacuum chuck or motorized vacuum chuck.

Wherein the said fire extinguishing device also includes cooling pipe used for cooling the hollow drill bit, and the cooling pipe is connected with the outlet of the main hydroturbine.

Benefits of the present invention include: Compared with the prior art, the hole-drilling and wall-penetrating fire extinguishing device provided by the present invention utilizes the water pressure of the pressure fire water pipe as its power sources, one line of which is used to drive the main hydroturbine to drill holes and another line is used to by the auxiliary hydroturbine to drive the high-pressure water pump to form high-pressure water, meanwhile, direct jetting and diffusing pores are provided near the tip of the hollow drill bit, which can form high-pressure water mist under the effect of the high-pressure water pump, whereby holes can be drilled, wall can be penetrated and fire can be extinguished by the high-pressure water mist. Since there is no need to open the door to the burning unit, no big amount of oxygen may be recharged into the room on fire, and no explosion may occur. After drilling hole directly through wall, floor, ceiling or door, fire extinguishing agent such as high-pressure water mist, non-combustible gas (inert gas), foam and dry powder, etc. can be injected for fire extinguishing. In this manner, not only the firemens safety can be safeguarded, but also can it put out the fire quickly, and in addition, the water loss resulted from traditional fire extinguishing methods can be greatly reduced. Meanwhile, the loss that may be suffered by the upper, lower, left and right neighboring units of the burning unit can also be greatly reduced. Furthermore, the hole-drilling and wall-penetrating fire extinguishing device according to the present invention is characterized by a light total weight. Using the pressure fire water pipe as the power source allows for easy intake and easy use. Its structure is simple allowing for easy operation and easy maintenance. The main wear only involves replacement of the drill bit, resulting in a reduced maintenance cost. It is light weighted and easily portable, only requiring two persons to handle, move and operate it, and thus, it can be easily moved to high floors of a building and used for fire extinguishing.

BRIEF DESCRIPTION OF DRAWINGS

FIG. 1 is a structure schematic demonstrating the hole-drilling and wall-penetrating fire extinguishing device of this invention.

A description of the designation numbers of the key components is given below.

| 1. Main hydroturbine | 2. Forward/backward diverter |
| 3. Adapting sleeve | 4. Hollow boring bit |
| 5. Hand-wheel booster | 6. Guide rail |

DETAILED DESCRIPTION OF THE PREFERRED EMBODIMENTS

The present invention is further described below in conjunction with the appended drawings.

Referring to FIG. 1, the hole-drilling and wall-penetrating fire extinguishing device according to the present invention is composed of hydroturbine 1, forward/backward diverter 2, adapting sleeve 3, hollow drill bit 4, hand-wheel booster 5, guide rail 6, water distributor 7, auxiliary hydroturbine 8 and high-pressure water pump 9; hand-wheel booster 5 is connected with main hydroturbine 1, main hydroturbine 1 is connected with the drive of hollow drill bit 4 via forward/backward diverter 2, adapting sleeve 3 is provided between hollow drill bit 4 and forward/backward diverter 2, main hydroturbine 1 and forward/backward diverter 2 are fixed on the guide rail; high-pressure water hose 10 used for connecting the pressure fire water pipe is connected with the inlet of water distributor 7, the first outlet of water distributor 7 is connected with main hydroturbine 1, the second outlet of water distributor 7 is connected with auxiliary hydroturbine auxiliary hydroturbine 8 is connected with the drive of high-pressure water pump 9, the third outlet of water distributor 7 is connected with the inlet of high-pressure water pump 9, and the outlet of high-pressure water pump 9 is connected first with adapting sleeve 3 via pressure water pipe 11 then with hollow drill bit 12; a number of direct jetting or diffusing pores 12 are provided near the tip of hollow drill bit 12, and the high-pressure water produced by high-pressure water pump 9 is jetted out through the fine pores on the drill bit to form high-pressure water mist, whereby hole is drilled and wall is penetrated and fire is extinguished by high-pressure water mist. Compared with the prior art, the hole-drilling and wall-penetrating fire extinguishing device provided by the present invention utilizes the water pressure of the pressure fire water pipe as its power sources, one line of which is used to drive main hydroturbine 1 to drill holes and another line is used to by auxiliary hydroturbine 8 to drive high-pressure water pump 9 to form high-pressure water, meanwhile, direct jetting and diffusing pores 12 are provided near the tip of the hollow drill bit 4, which can form high-pressure water mist under the effect of high-pressure water pump 9, whereby holes can be drilled, wall can be penetrated and fire can be extinguished by the high-pressure water mist. Since there is no need to open the door to the burning unit, no big amount of oxygen may be recharged into the room on fire, and no explosion may occur. After drilling hole directly through wall, floor, ceiling or door, fire extinguishing agent such as high-pressure water mist, non-combustible gas (inert gas), foam and dry powder, etc. can be injected for fire extinguishing. In this manner, not only the firemen's safety can be safeguarded, but also can it put out the fire quickly, and in addition, the water loss resulted from traditional fire extinguishing methods can be greatly reduced. Meanwhile, the loss that may be suffered by the upper, lower, left and right neighboring units of the burning unit can also be greatly reduced. Furthermore, the hole-drilling and wall-penetrating fire extinguishing device according to the present invention is characterized by a light total weight. Using the pressure fire water pipe as the power source allows for easy intake and easy use. Its structure is simple allowing for easy operation and easy maintenance. The main wear only involves replacement of the drill bit, resulting in a reduced maintenance cost. It is light weighted and easily portable, only requiring two persons to handle, move and operate it, and thus, it can be easily moved to high floors of a building and used for fire extinguishing.

In this embodiment, the aforesaid main hydroturbine 1 is a singular hydroturbine or a hydrotrubine bank composed of at least two hydroturbines. Of course, the use of other forms of power to drive the hollow drill bit can also achieve the same effect, eg., gasoline engine, electric motor or hydraulic or pneumatic drive. However, power supply for high-rise or super high-rise buildings is usually cut off in case of fire, when there is no power supply available for use by electric power units. When it comes to the long-time use of internal combustion power units on floors, it is difficult to use them in corridors and staircases where the space is limited. Therefore, for fire extinguishing in high-rise or super high-rise buildings, the use of the pressure from the fire protection system existing in high-rise buildings as the power source for driving hydroturbines is the best choice, whereas other forms of power may be used on ground or in places with a large space, eg., warehouse on ground, aircraft and railway car, etc.

When there is no special limit on the various kinds of noise and waste gas, and where electric power or other power supplies are available, DC motor, hydraulically driven pump, pneumatically driven pump and other types of power sources may be used in place of the hydroturbine in this hole-drilling and wall-penetrating fire extinguishing device, where structure of the hole-drilling and wall-penetrating fire extinguishing device remains basically unchanged, with the only change being the power drive method, thus, this is only another method that also falls in the protection range of the present patent. Of course, the present invention is not limited to the aforesaid structure for fulfilling the hole-drilling and wall-penetrating fire extinguishing device of the present invention, and hole drilling, wall penetration and fire extinguishing can be realized just by using a hydroturbine to drive the hollow drill bit for hole drilling and for water jetting. Any structure with any deletion and reduction on the main technical scheme of the present invention belongs to a deteriorated design of the present invention, and should also be understood as a variation of the present patent, thus, falling in the protection range of the present case.

In this embodiment, the aforesaid forward/backward diverter 2 is a reversing gearbox composed of one gear set which turns the singular rotating direction inputted by the main hydroturbine into two rotating directions, namely, forward and backward directions. Rotating force of the spindle of the hydroturbine is transmitted to the forward/backward diverter (namely the reversing gearbox), to provide forward and backward revolutions for the hollow drill bit. Generally speaking, forward revolution refers to the forward turn-in direction of the hollow drill bit while backward revolution refers to the direction for turning out the hollow drill bit.

In this embodiment, the aforesaid hollow drill bit 4 is a carbon steel drill bit used for cutting iron and steel, a diamond drill bit used for cutting glass or an artificial hollow thin-walled diamond drill bit used for cutting concrete. Hollow drill bit 4 is replaceable in the hole-drilling and wall-penetrating fire extinguishing device according to the present invention. Materials used for fabricating hollow drill bit 4 as well as its shape are determined according to the materials of walls and doors to be drilled through. Roughly three types can be divided into: one is carbon steel drill bit, like auger, etc. allowing for easy drilling of iron and steel, which is used to deal with metallic materials such as steel building, high-speed rail car, deck and partition of ship and warship, shell of aircraft, etc. Another type is glass drill bit, like diamond, etc. allowing for easy drilling of glass, which is used to deal with glass building material such as glass wall of a shopping mall and partition wall of a bank, etc. The other type is concrete drill bit, namely, artificial diamond hollow thin-walled diamond drill bit, commonly known as bunghole borer, specially used for concrete sample drilling and for pipe erection, which is used to deal with concrete building material such as wall, ceiling and floor slab, etc. of a concrete building. Multi-purpose drill bit can also be used, where one type of drill bit can deal with several types of materials.

However, regardless of which type of drill bit, its inside shall be designed as hollow to allow water and other types of fire extinguishing agents to pass through. All such drill bits are called hollow drill bits. The front end of the drill bit is a sharp drill tip, and a number of direct jetting and diffusing pores are provided near the drill tip. The front direct jetting pores enable the water mist to be jetted further while the rear diffusing pores enable a wider diffusion of water mist. Large area of water mist is more helpful for vaporization, and also provides a better cover of the firemen who can fight the fire safely.

In this embodiment, the said adapting sleeve 3 is installed at the rear-end neck of the hollow drill bit, and more than one quick couplings are provided adapting sleeve 3 which are used for connecting with the external fire extinguishing apparatus. There are holes on the rear-end neck of hollow drill bit 4 which are used to connect with adapting sleeve 3 and for tight sealing. The adaptive sleeve of hollow drill bit 4 functions to connect and transport external fire extinguishing agent to the hollow drill bit. Adapting sleeve 3 is securely connected with the rear-end neck of the hollow drill bit. Quick couplings are provided on the circumference of adapting sleeve 3. The quick couplings are used to introduce fire extinguishing agent such as high-pressure water mist, etc. into the adaptive sleeve, from there it is jetted out of the fire extinguishing channel through hollow drill bit 4. To maintain a stable rotation of the hollow drill bit, there must be more than one quick couplings symmetrically installed on the circumference of the adaptive sleeve so that hollow drill bit 4 can be more balanced when rotating without producing any shaking movement. Diameter of the hollow drill bit should be more than 1 cm, and diameter of hollow drill bit 4 should be designed for different types of fire extinguishing agents or the magnitude of flow so as to ensure sufficient flow for fire extinguishing.

In this embodiment, the said hand-wheel booster 5 is composed of rotating hand-wheel and thick screw, and the said hand-wheel and thick screw are horizontally connected one after another, or are connected at 90° with each other through a right-angle bevel gear. Pressure is imposed on hollow drill bit 4 via hand-wheel booster 5 on rail 6. Hand-wheel booster 5 is a combination of screw rod and hand-wheel, with the screw rod pressing against the rear end of main hydroturbine 1. When the hand-wheel rotates forward to push the screw rod to press against the rear end of main hydruturbine 1 stably on guide rail 6, main hydroturbine 1 moves on guide rail 6 simultaneously with adapting sleeve 3 and hollow drill bit 4 to drill hole in a wall. When the hand-wheel rotates backward, it pulls the screw rod and main hydroturbine 1 out on the guide rail. The combination of hand-wheel and screw rod may be a horizontal back and forth structure, or a bevel gear drive structure with the hand-wheel and the screw rod forming a right angle.

In this embodiment, the aforesaid high-pressure water pump 9 is a plunger type or centrifugal light-duty high-pressure water pump. Of course, this invention is not limited to these two types of high-pressure water pump, and other types of high-pressure water pumps may also be utilized.

In this embodiment, the aforesaid fire extinguishing device also includes a multi-angle support used for fixing the guide rail 6 and changing the operating angle of the components on the guide rail 6 (not shown in the drawing), and the said multi-angle support is fixedly coupled with the guide rail 6. The forward/backward diverter, hollow drill bit and adapting sleeve need rail type stabilization device when moving toward and drilling the object. The said rail type stabilization device is called guide rail. Function of the guide rail is that shaking is not caused to the entire unit during quick rotation of the hollow drill bit. Its another function is that the drill bit is able to drill only with the help of the guide rail, which provides imposed external forces in a stable manner, enabling the drill bit to drill holes or stably retreat after drilling.

In this embodiment, the aforesaid fire extinguishing device also includes chuck used for fixing the multi-angle support (not shown in the drawing), and the said support fixing chuck is manual vacuum chuck or motorized vacuum chuck.

In this embodiment, the aforesaid fire extinguishing device also includes cooling pipe (not shown in the drawing) used for cooling hollow drill bit 4, and the cooling pipe is connected with the water outlet of the main hydroturbine. The low-pressure water discharged from main hydroturbine 1 is sprayed on hollow drill bit 4 in the process of hole drilling. It can be used to cool hollow drill bit 4 and for swarf flushing in order to prolong the service life of hollow drill bit 4.

In any urban high-rise building that has been certified by the fire protection authorities, pressure fire water pipeline is available on each floor during routine operation as long as the fire protection system is normal, no matter how tall the building might be. In general, the water pressure in the pipeline is approximately 10 bar. In case of fire, the sprinklers in the corridors or public places would spray water to extinguish the fire automatically (except for old-style buildings where the firewater pipes of the fire protection system of the buildings are trunk pipes, and in case of fire, the firemen would temporarily connect pressure water from the nozzle of underground fire hydrant or from their fire engines and use it for fire extinguishing on high floors).

Pressure water of the tire protection system inside an urban high-rise building the main source of power and water for the hole-drilling and wall-penetrating fire extinguishing device of the present invention. Even if the fire water supply system inside a high-rise building fails, or when the fire water pressure is low or there is not water flow at all, the firemen are also able to deliver pressure water to high floors.

Rotation of the hydroturbines of the hole-drilling and wall-penetrating fire extinguishing device according to the present invention requires appr. 10 bar pressure water for driving. The pressure of the fire protection system inside the urban high-rise buildings can be directly used by the hydroturbines without any other conversion. The hydroturbine has two ports: the pressure water through one inlet pushes the impeller to rotate, which then drive the spindle via the forward/backward diverter; the low-pressure water resulted after driving the impeller is discharged through the other port. The discharged low-pressure water can be used for cooling the drill bit.

In case of fire in a high-rise or super high-rise building, when outside firefighting method is adopted, water jet from the aerial ladder fire truck sometimes cannot reach the burning location because the building is too tall. Even on floors that can be reached by the water jet from the aerial ladder fire truck, a large area of waterlog may be formed due to the large amount of water used, which may affect and cause damage to the left, right and lower neighboring units. Therefore, when inside firefighting method is adopted by which the fire in the burning unit is to be put out from the floor of the burning unit, it is necessary to break the door of the burning unit, and this may cause a large amount of oxygen to suddenly enter the unit, as a result, explosion may be caused, endangering life safety of the firemen. This may also cause the fire to spread to other units nearby. Firemen casualties occurred frequently due to explosion of burning units.

When the hole-drilling and wall-penetrating fire extinguishing device according to the present invention is used for fire extinguishing in high-rise buildings, inside firefighting method should be adopted to put out the fire in the burning unit on the same floor on which the burning unit is located.

Specific operating procedure is as follows (FIG. 1): Place the hole-drilling and wall-penetrating fire extinguishing device at the door of the burning unit, and select a proper hollow drill bit (4) and install it on forward/backward diverter (3), and then aim the hollow drill bit (4) at the door or place it in a proper position. Connect the high-pressure water hose (10) used for the fire hydrant pipe of the floor with the inlet of main hydroturbine (1) on the hole-drilling and wall-penetrating fire extinguishing device via water distributor (7). At that moment, the other two outlets of water distributor (7) are closed. Open the feed water valve of the fire hydrant, and water distributor (7) feeds water to main hydroturbine (1), then main hydroturbine (1) rotates and drives forward/backward diverter (2), and drives hollow drill bit (4) to rotate in the forward direction and start drilling. Turn the hand-wheel in forward direction to push the screw rod, ie., hand-wheel booster (5) presses forward, and main hydroturbine (1), forward/backward diverter (2) and hollow drill bit (4) steadily drill into the wall or door on guide rail (6) until drill through, and do not retreat after penetration. Water distributor (7) stops feeding water to main hydroturbine (1), and close this water feed nozzle. Pass pressure water (10) to the other two outlets via water distributor (7) for driving auxiliary hydroturbine (9), which in turn drives high-pressure water pump (9) to produce high-pressure water. Connect it with the quick coupling of adapting sleeve (3) on the rear-end neck of hollow drill bit (4) through high-pressure water pipe (11) at the outlet of the high-pressure water pump, then high-pressure water mist is jetted into the room through the fine pores (12) in front of hollow drill bit (4) until the fire is put out.

The second option is to put out the fire without using high-pressure water mist. After the wall or door of the burning unit is penetrated by hollow drill bit (4), do not pull out the drill bit. Connect the compressed fire extinguishing agent such as compressed CO2, nitrogen, dry powder and inert gas, etc. with the quick coupling of adapting sleeve (3) on the rear-end neck of hollow drill bit (4) and directly jet gas, dry powder and other kinds of fire extinguishing agents into the burning unit until the fire is put out.

After the fire is put out, pull pressure pipe (11) off adapting sleeve (3). Then water distributor (7) feed water to main hydroturbine (1) again to rotate it, and then close the other two outlets. Swivel the reversing handle via forward/backward diverter (2), and turn hollow drill bit (4) in the reversed direction. Use the hand-wheel on booster (5) to turn the screw rod in the reversed direction to pull hollow drill bit (4) to retreat.

Advantages of the present invention are as follows:

1. Such kind of hole-drilling and wall-penetrating fire extinguishing device can also be used an environmental fire occurring in special low space, for example, an environmental fire in special enclosed low space such as archives room, control room, cultural relic storage or ship and warship, passenger liner, high-speed rail car and aeroplane, etc. Hole can be drilled for fire extinguishing without any need for opening the enclosing door of the burning unit, in which manner not only the fire can be put out safely and quickly, damage caused by the waterlog resulted from fire extinguishing can also be reduced. This is because the high-pressure water mist is immediately vaporized when entering the high-temperature firing space, which results in a big water vapor volume nearly a thousand times more than that of the water mist, which isolates the flow of oxygen and prevents continued combustion. The use of high-pressure water mist for fire extinguishing requires less water, thus, reducing the waterlog loss, which is more rational than traditional fire extinguishing methods using a large amount of water to cool and put out the fire source.

2. Such kind of hole-drilling and wall-penetrating fire extinguishing device can also be used for putting out oil depot fire. A fire occurring on top of a large-size oil tank may cause explosion after long time combustion, which may affect the neighboring oil tanks. As long as a fixing device is welded at bottom of the oil tank, the hole-drilling and wall-penetrating fire extinguishing device can be used to drill through the oil tank for jetting light foam, and as the light foam rises to the oil surface level and fully covers it, the flame will quickly go out as a result of isolation between the oil and oxygen.

3. Such kind of hole-drilling and wall-penetrating fire extinguishing device is also applicable in the anti-terror field. When rescuing hostages held by the attackers, the hole-drilling and wall-penetrating fire extinguishing device can be used to drill holes into the units where the hostages are kept in proper locations, through which anesthetics or dacryagogue may be injected to protect the hostages, capture the terrorists, thus, reducing casualties and damage to properties.

The above have been only several specific embodiments of the present invention. However, the present invention is not limited to these, and all variations that can be thought of by any technical person shall fall into the protection range of the present invention.

The invention claimed is:

1. A hole-drilling and wall-penetrating fire extinguishing device, wherein it comprises main hydroturbine, forward/backward diverter, adapting sleeve, hollow drill bit, hand-wheel booster, guide rail, water distributor, auxiliary hydroturbine, high-pressure water pump;

said hand-wheel booster is connected with the main hydroturbine, the main hydroturbine is connected with the drive of the hollow drill bit via the forward/backward diverter, adapting sleeve is also provided between said hollow drill bit and forward/backward diverter, and said main hydroturbine and forward/backward diverter are fixed on the guide rail;

a high-pressure water hose used for connecting a pressure fire water pipe is connected with the inlet of the water distributor, the first outlet of said water distributer is connected with the main hydroturbine, the second outlet of said water distributor is connected with the auxiliary hydroturbine, said auxiliary hydroturbine is connected with the drive of the high-pressure water pump, the third outlet of said water distributor is connected with the inlet of the high-pressure water pump, and the outlet of said main high-pressure water pump is connected with the hollow drill bit via the adaptive sleeve; and a number of small pores used for direct jetting and diffusing are provided near the tip of said hollow drill bit.

2. The hole-drilling and wall-penetrating fire extinguishing device according to claim 1, wherein said main hydroturbine is a singular hydroturbine or a hydroturbine bank composed of at least two hydroturbines.

3. The hole-drilling and wall-penetrating fire extinguishing device according to claim 1, wherein said forward/backward diverter is a reversing gearbox composed of one gear set which turns the singular rotating direction inputted by the main hydroturbine into two rotating directions, namely, forward and backward directions.

4. The hole-drilling and wall-penetrating fire extinguishing device according to claim 1, wherein said hollow drill bit is a carbon steel drill bit used for cutting iron and steel, a diamond drill bit used for cutting glass or an artificial hollow thin-walled diamond drill bit used for cutting concrete.

5. The hole-drilling and wall-penetrating fire extinguishing device according to claim 1, wherein said adapting sleeve is installed at the rear-end neck of the hollow drill bit, on which more than one quick couplings are provided and used for connecting with the external fire extinguishing agent.

6. The hole-drilling and wall-penetrating fire extinguishing device according to claim 1, wherein said hand-wheel booster is composed of rotating hand-wheel and thick screw, and said hand-wheel and thick screw are horizontally connected one after another, or are connected at 90° with each other through a right-angle bevel gear.

7. The hole-drilling and wall-penetrating fire extinguishing device according to claim 1, wherein said high-pressure water pump is a plunger type or centrifugal light-duty high-pressure water pump.

8. The hole-drilling and wall-penetrating fire extinguishing device according to claim 1, wherein said fire extinguishing device also includes a multi-angle support used for fixing the guide rail and changing the operating angle of the components on the guide rail, and said multi-angle support is fixedly coupled with the guide rail.

9. The hole-drilling and wall-penetrating fire extinguishing device according to claim 1, wherein said fire extinguishing device extinguishing device also includes chuck used for fixing the multi-angle support, and said support fixing chuck is manual vacuum chuck or motorized vacuum chuck.

10. The hole-drilling and wall-penetrating fire extinguishing device according to claim 1, wherein said fire extinguishing device also includes cooling pipe used for cooling the hollow drill bit, and the cooling pipe is connected with the outlet of the main hydroturbine.

* * * * *